US012591360B2

(12) United States Patent
Quint et al.

(10) Patent No.: US 12,591,360 B2
(45) Date of Patent: Mar. 31, 2026

(54) USER INTERFACE ADJUSTMENT BASED ON PROXIMITY TO UPCOMING MANEUVER

(71) Applicant: RIVIAN IP HOLDINGS, LLC, Irvine, CA (US)

(72) Inventors: Jason Meyer Quint, Ann Arbor, MI (US); Samuel Morgan Roberts, Santa Cruz, CA (US); Matthew Miller, San Francisco, CA (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 0 days.

(21) Appl. No.: 17/846,816

(22) Filed: Jun. 22, 2022

(65) Prior Publication Data

US 2023/0418449 A1 Dec. 28, 2023

(51) Int. Cl.
| | |
|---|---|
| *G06F 3/04847* | (2022.01) |
| *G01C 21/36* | (2006.01) |
| *G06F 3/0488* | (2022.01) |

(52) U.S. Cl.
CPC ..... *G06F 3/04847* (2013.01); *G01C 21/3667* (2013.01); *G06F 3/0488* (2013.01); *G06F 2203/04804* (2013.01)

(58) Field of Classification Search
CPC .............. G06F 3/04847; G06F 3/0488; G06F 2203/04804; G01C 21/3667
USPC ......................................... 715/768
See application file for complete search history.

(56) References Cited

U.S. PATENT DOCUMENTS

| | | | | |
|---|---|---|---|---|
| 8,175,806 | B2 * | 5/2012 | Kodaira ............. | G08G 1/09675 |
| | | | | 382/104 |
| 11,768,083 | B2 * | 9/2023 | Hajj ................... | G01C 21/3492 |
| | | | | 701/533 |
| 12,265,364 | B2 * | 4/2025 | Coffman ............ | H05B 47/1965 |
| 2009/0112465 | A1 * | 4/2009 | Weiss .................. | G01C 21/367 |
| | | | | 701/431 |
| 2011/0054775 | A1 * | 3/2011 | Snyder ............... | G01C 21/3655 |
| | | | | 701/533 |
| 2011/0078746 | A1 * | 3/2011 | Chung ............... | H04N 21/4542 |
| | | | | 348/E7.001 |
| 2013/0176328 | A1 * | 7/2013 | Pillai ................. | G01C 21/3664 |
| | | | | 345/592 |
| 2013/0345980 | A1 * | 12/2013 | Van Os ............... | G09G 3/3413 |
| | | | | 701/538 |
| 2015/0022466 | A1 * | 1/2015 | Levesque ............... | G06F 21/31 |
| | | | | 345/173 |
| 2017/0080857 | A1 * | 3/2017 | Herman ............... | G01S 15/931 |
| 2019/0339918 | A1 * | 11/2019 | Boule .................. | G06F 3/0482 |

(Continued)

OTHER PUBLICATIONS

"Using the Touchscreen—Maps and Navigation," Tesla Model 3 Owner's Manual, pp. 129-134, May 1, 2022.
Apple CarPlay App Programming Guide, 54 pages, Jun. 7, 2022.

*Primary Examiner* — William L Bashore
*Assistant Examiner* — Koorosh Nehchiri
(74) *Attorney, Agent, or Firm* — HG LAW LLP

(57) ABSTRACT

Method and systems for adjusting a panel based on a vehicle's proximity to an upcoming maneuver within a navigation user interface (UI) and the presence of mapping data within a display region of a UI layer (e.g., a media UI or a call UI). Processing circuitry may modify access to the UI layer until after the vehicle completes the maneuver or, if the UI layer is already in view, hide the UI layer while the vehicle executes the maneuver.

18 Claims, 8 Drawing Sheets

(56)        References Cited

U.S. PATENT DOCUMENTS

| | | | |
|---|---|---|---|
| 2022/0299335 A1* | 9/2022 | Carbune | ........... G01C 21/3629 |
| 2023/0134475 A1* | 5/2023 | Prukop | ............. G01C 21/3667 |

* cited by examiner

102

102

102

102

700

702
Detect an Upcoming Maneuver of a Vehicle

704
Determine Whether Mapping Data Relevant to the Upcoming Maneuver is Present in a Display Region Such that it Would be Obscured by a User Interface (UI) Layer 706
Modify a Parameter of the UI Layer to Prevent the Relevant Mapping Data from Being Obscured

USER INTERFACE ADJUSTMENT BASED ON PROXIMITY TO UPCOMING MANEUVER

INTRODUCTION

The present disclosure relates to adjusting a user interface based on a vehicle's proximity to an upcoming maneuver. In particular, the present disclosure relates to modifying access to a user interface (UI) layer while a vehicle is within a threshold distance from a maneuver. The present disclosure also includes hiding a UI layer while the vehicle is within a threshold distance from a maneuver.

SUMMARY

In-vehicle infotainment systems can display information and controls related to media, phone communication, drive modes, vehicle settings, etc. as a UI layer on top of a navigation map to limit app switching and, thereby, reduce driver distraction while operating a vehicle. For example, a user (e.g., a driver) may invoke a UI layer (e.g., a media UI, a call UI, etc.) to appear on top of a navigation UI, where the user may see details of the song currently playing concurrently with navigation instructions to reach the user's destination on the same display. This eliminates a need for the user to toggle back and forth between separate Navigation and Media apps. When the user activates the UI layer it may cover a region of the navigation UI and, accordingly, obscure mapping data (e.g., landmarks, buildings, streets, etc.). This may not present a problem because the user does not need to execute a maneuver soon. Therefore, even if the UI layer obstructs a portion of a route or relevant mapping data, the user can continue to travel along the current route without a problem. When close to a maneuver, however, if the user invokes the UI layer it may obscure mapping data the user could otherwise use to determine exactly where or when to execute the maneuver, in which case the user may miss the maneuver due to the obstruction of the navigation UI.

Systems and methods are described herein for a user interface (UI) system that includes a display, a navigation UI displayed on the display, and a UI layer capable of being displayed in a display region above the navigation UI. The UI system may further comprise processing circuitry configured to detect an upcoming maneuver of a vehicle and, in response to detecting the upcoming maneuver, determine whether mapping data relevant to the upcoming maneuver is present in the display region such that it would be obscured by the UI layer. In response to determining that the mapping data is present, a parameter of the UI layer is modified to prevent the relevant mapping data from being obscured. In some embodiments, the modified parameter of the UI layer may include translucency of the UI layer, size of the UI layer, location of the UI layer, or activation of the UI layer. In some embodiments, the UI layer may comprise a media UI or a call UI.

In some embodiments, the processing circuitry may be further configured to display the UI layer in the region above the navigation UI in response to a user input, where modifying the parameter of the UI layer comprises preventing the display of the UI layer in response to the user input and, in some embodiments, may further comprise displaying the UI layer upon completion of the vehicle's maneuver.

In some embodiments, modifying the parameter of the UI layer may comprise deactivating the UI layer to hide the UI layer. In some embodiments, the processing circuitry may be further configured to, while the UI layer is hidden, override the UI layer's deactivation and display the UI layer in response to a gesture input on the display. In some embodiments, the UI layer may include a selectable option, and the processing circuitry may be further configured to, while the UI layer is hidden, respond to a selection of the hidden selectable option when an area of the display is touched that corresponds to the location of the hidden selectable option.

In some embodiments, the processing circuitry may be configured to detect the upcoming maneuver based on distance (e.g., 500 feet, 0.1 miles, 0.5 miles, 1 mile, etc.) to the upcoming maneuver or time (e.g., 30 seconds, 45 seconds, 1 minute, etc.) to the upcoming maneuver. It will be understood that processing circuitry may use any suitable distance or any suitable time. In some embodiments, the modifying of the parameter of the UI layer may be prevented based on driver behavior, where the driver behavior may comprise routes to common destinations.

BRIEF DESCRIPTION OF DRAWINGS

The above and other features of the present disclosure, its nature, and various advantages will be more apparent upon consideration of the following detailed description, taken in conjunction with the accompanying drawings in which.

DETAILED DESCRIPTION

In some embodiments, the present disclosure relates to a user interface (UI) system that detects upcoming maneuvers of a vehicle (e.g., a vehicle traveling along a guided route) and modifies one or more parameters of a UI layer to prevent navigation mapping data relevant to the upcoming maneuvers from being obscured. In some embodiments, the one or more parameters of the UI layer, which can be modified, may include translucency of the UI layer, size of the UI layer, location of the UI layer, or activation of the UI layer. The UI layer may be a media UI or a call UI. In some embodiments, processing circuitry of the UI system may be configured to detect the upcoming maneuver based on distance (e.g., 500 feet, 0.1 miles, 0.5 miles, 1 mile, etc.) to the upcoming maneuver or time (e.g., 30 seconds, 45 seconds, 1 minute, etc.) to the upcoming maneuver. It will be understood that processing circuitry may use any suitable distance or any suitable time with respect to the upcoming maneuver. In some embodiments, modification of the parameter of the UI layer may be prevented based on driver behavior (e.g., when the driver is following a route to a common destination for that driver).

Figure 1A:
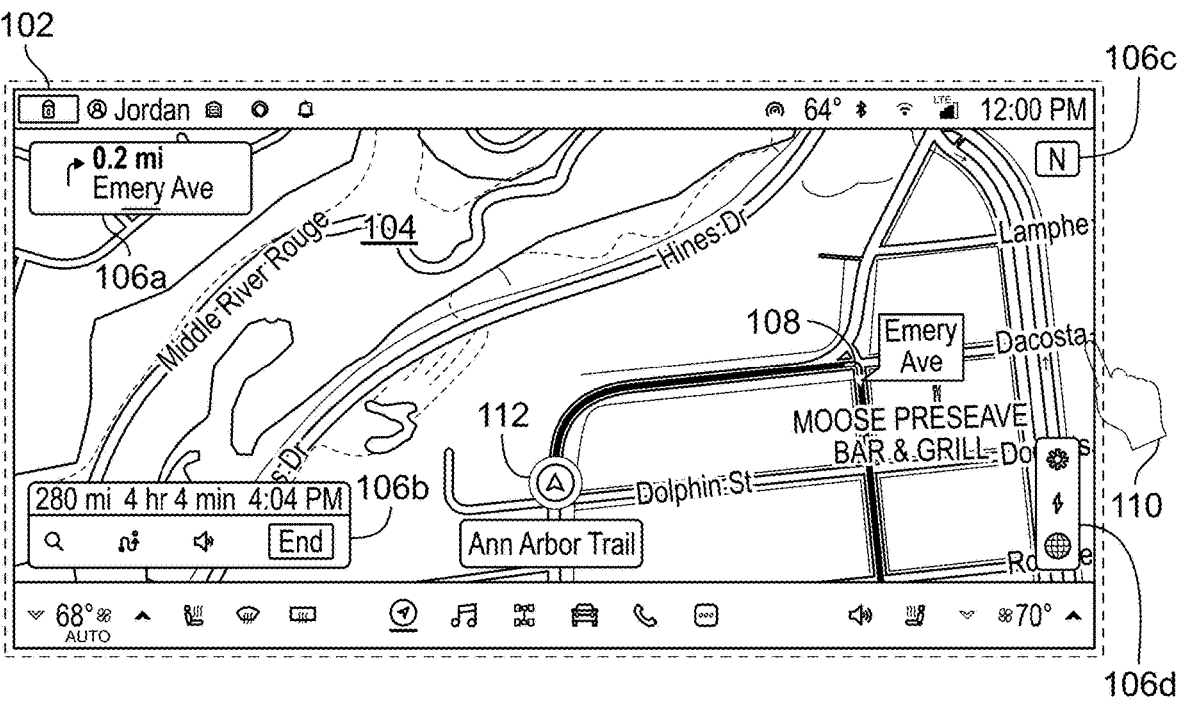
FIG. 1A shows an illustrative user interface, in accordance with some embodiments of the present disclosure.

FIG. 1A shows an illustrative user interface 102, in accordance with some embodiments of the present disclosure. User interface 102 includes navigation UI 104, which includes navigation UI features 106a, 106b, 106c, and 106d, maneuver 108, gesture input 110, and vehicle puck 112. Although FIG. 1A depicts navigation UI 104 with four navigation UI features 106a, 106b, 106c, and 106d, it will be understood that navigation UI 104 may include any suitable number of navigation UI features with any suitable content and functionality. In some embodiments, navigation UI 104 is coupled to processing circuitry to receive and/or run instructions. In some embodiments, navigation UI 104 displays any suitable mapping data depicting the environment surrounding a vehicle. It will be understood that FIG. 1A is an illustrative embodiment of a UI and any featured components may be modified or substituted in accordance with the present disclosure.

User interface 102 hosts UI elements (e.g., navigation UI 104 and other UI layers) integrated into the operating system of the vehicle for display to a user. In some embodiments, user interface 102 may show multiple UI elements concurrently to limit user (e.g., driver) distraction while operating the vehicle (e.g., so that the user does not need to toggle back and forth between the UI elements). For example, user interface 102 may show navigation UI 104 for a user needing directions to a particular destination, while simultaneously displaying a media UI that allows the user to play, pause, or toggle between songs. In some embodiments, user interface 102 may be presented on a central information display of the vehicle or a driver instrument panel of the vehicle. The user may initiate gesture input 110, via user interface 102, to access the vehicle's features (e.g., heating, ventilation, and air conditioning (HVAC) control, media content, vehicle information, drive modes, telephone communication, vehicle settings, sensors, etc.). It will be understood that user interface 102 may be coupled to processing circuitry to receive and/or run instructions. Navigation UI 104 is one of multiple UI layers that may be provided as part of the operating system for the vehicle and includes mapping data (e.g., any suitable road, highway, landmark, building, landmass, body of water, region, etc.) that depicts the surroundings of the vehicle. For example, FIG. 1A includes mapping data of a body of water (e.g., Middle River Rouge) and a restaurant (e.g., Moose Preserve Bar & Grill) that may each be useful for orienting a user in unfamiliar surroundings. Navigation UI 104 charts the vehicle's path to a particular destination decided by the user, which may require the vehicle to execute at least one maneuver 108 (e.g., a right turn at an intersection, exiting from a highway, a U-turn, etc.) to reach the user's destination in a timely manner. It will be understood that maneuver 108 may include any legal driving action by the vehicle. Navigation UI 104 includes various navigation UI features 106a, 106b, 106c, and 106d that each provide the user more information on their current location in relation to their destination (e.g., distance to next maneuver 108, current direction, etc.) as well as an overview of the route to their destination (e.g., estimated time of arrival, total distance to destination, etc.).

Navigation UI feature 106a conveys to the user the amount of distance, in miles, the vehicle is away from the upcoming maneuver 108. For example, as depicted in FIG. 1A, navigation UI feature 106a shows that vehicle puck 112 is approximately 0.2 miles from a right turn on Emery Avenue (e.g., maneuver 108). In some embodiments, the distance to maneuver 108 may be conveyed in kilometers as opposed to miles. Navigation UI feature 106b provides an overview for the vehicle's route to its destination by including total distance to the destination, trip duration (e.g., in hours and minutes) to the destination, and an estimated time of arrival at the destination. For example, as depicted in FIG. 1A, the vehicle is travelling a total distance of 280 miles, which will approximately take the vehicle 4 hours and 4 minutes to complete and result in the vehicle arriving at its destination at approximately 4:04 PM. It will be understood that the vehicle may travel to any suitable destination, and navigation UI feature 106b may accordingly display any suitable distance to the destination, any suitable trip duration to the destination, and any suitable estimated time of arrival at the destination. Navigation UI feature 106b further includes a search component that allows the user to search for locations (e.g., charging stations, restaurants, grocery stores, coffee shops, etc.) along the vehicle's route to its destination. For example, the user may search "McDonald's" if it's late and they wish to pick up food quickly to still reach their destination by a certain time. In another example, the user may search "nearest charging station" if their vehicle's battery state of charge is significantly depleted. In some embodiments, navigation UI feature 106b may include a route preview component that, upon user selection, zooms out and allows the user to see the vehicle's entire route to their destination. In some embodiments, the route preview component may show alternate routes (e.g., avoiding traffic, without toll roads, etc.) to the vehicle's destination. In some embodiments, the route preview may include a list of directions for the user (e.g., driver) to follow as opposed to the map guidance format. Navigation UI feature 106b includes a voice guidance component that, upon user selection, activates voice guidance that announces upcoming vehicle maneuvers 108 (e.g., a left turn at an intersection, a left merge onto a highway, arrival at the destination, etc.). In some embodiments, a UI layer (e.g., a media UI, a call UI, etc.) may be concurrently open with navigation UI 104, in which case, if the voice guidance component has been selected, the voice guidance may interrupt media from the UI layer to announce the upcoming maneuver 108. Navigation UI feature 106b further includes a termination component that, upon user selection, ends the vehicle's trip to its destination. In some embodiments, after being selected, the termination component may generate a window requesting confirmation of the termination of the vehicle's trip.

Navigation UI feature 106c acts as a compass so the user can determine which direction the vehicle is currently travelling. Navigation UI feature 106d includes a settings component that provides access to various preferences the user may personalize, with respect to navigation UI 104, to improve their driving experience. For example, in some embodiments, the settings component may include options to avoid highways, avoid toll roads, prioritize battery-efficient routes, choose a map color scheme (e.g., day or night), choose a unit for distance (e.g., miles or kilometers), show speed limits, include traffic in the mapping data, or save the vehicle's parking location. Navigation UI feature 106d further includes a charge icon that, upon user selection, displays the geographic locations of electric vehicle charging stations proximate to the vehicle. In addition to the charge icon, navigation UI feature 106d provides a selectable globe icon that, when selected, activates a satellite map layer above navigation UI 104. In some embodiments, a user may select the globe icon within navigation UI feature 106d in the middle of a trip to a destination, in which case processing circuitry switches to the satellite map without interrupting the vehicle's navigation to its destination. It will be understood that the settings component may include any suitable user preference with regards to navigation UI 104.

Gesture input 110 represents a user interaction with user interface 102 (e.g., swiping the right edge of user interface 102 from right to left) that prompts a UI layer (e.g., a media UI, a call UI, etc.) to concurrently appear with navigation UI 104 (e.g., in a display region above navigation UI 104). It will be understood that any suitable gesture input 110 by the user, or any other suitable user input such as selecting a physical button, may invoke the UI layer. In some embodiments, various gesture inputs 110 (e.g., with more than one finger, in a distinct direction, in a distinct location, with pressure applied to user interface 102, etc.) may prompt various UI layers to appear above navigation UI 104. Vehicle puck 112 represents the vehicle's current position and orientation along a route the navigation UI 104 has charted to the vehicle's destination.

Figure 1B:
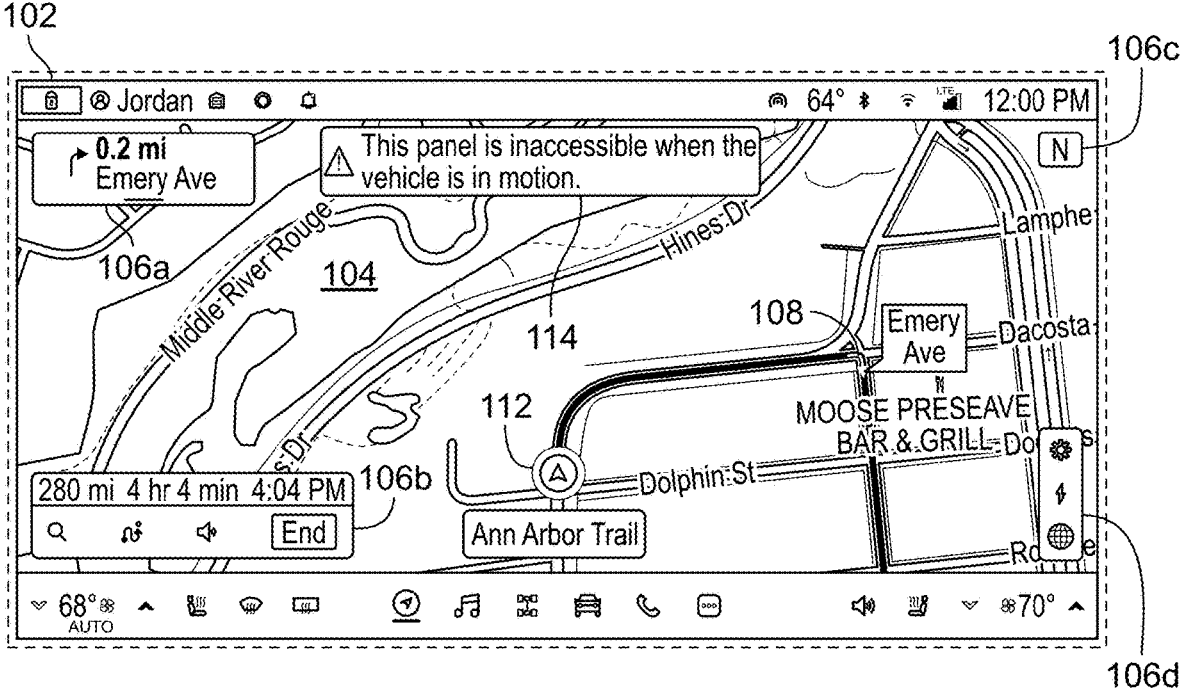
FIG. 1B shows an illustrative user interface including a vehicular notification, in accordance with some embodiments of the present disclosure.

FIG. 1B shows an illustrative user interface 102 including a vehicular notification 114, in accordance with some embodiments of the present disclosure. User interface 102 includes navigation UI 104, which includes navigation UI features 106a, 106b, 106c, and 106d, maneuver 108, and vehicle puck 112 of FIG. 1A. In addition, FIG. 1B includes notification 114, where processing circuitry, coupled to navigation UI 104, may determine when to present notification 114. It will be understood that FIG. 1B is an illustrative embodiment of a user interface, and any featured components may be modified or substituted in accordance with the present disclosure.

In some embodiments, processing circuitry prohibits access to additional UI layers (e.g., a media UI, a call UI, etc.) and generates notification 114, in response to a gesture input, when the vehicle is traveling or traveling faster than a threshold speed (e.g., 1 mph). It will be understood that the threshold speed may be any suitable speed. For example, in some embodiments, the threshold speed may be 5 mph, so the user may access a UI layer, via a gesture input, when the vehicle travels slower than 5 mph. However, if the vehicle surpasses 5 mph, processing circuitry may prohibit access to the UI layer until the vehicle decreases its speed to less than 5 mph. In some embodiments, the processing circuitry prevents a UI layer from obscuring mapping data (e.g., a building, a landmark, etc.) on navigation UI 104 while the vehicle is in motion, which may help a user (e.g., a driver) correctly identify when to execute a maneuver 108 (e.g., a right turn at a stop sign). Continuously blocking access to a UI layer with notification 114 when the vehicle is in motion, however, may bother the user, and, to access the UI layer, the user may need to go into a specific application, which requires extra steps and adds as a distraction while driving the vehicle.

Figures 2A, 2B:
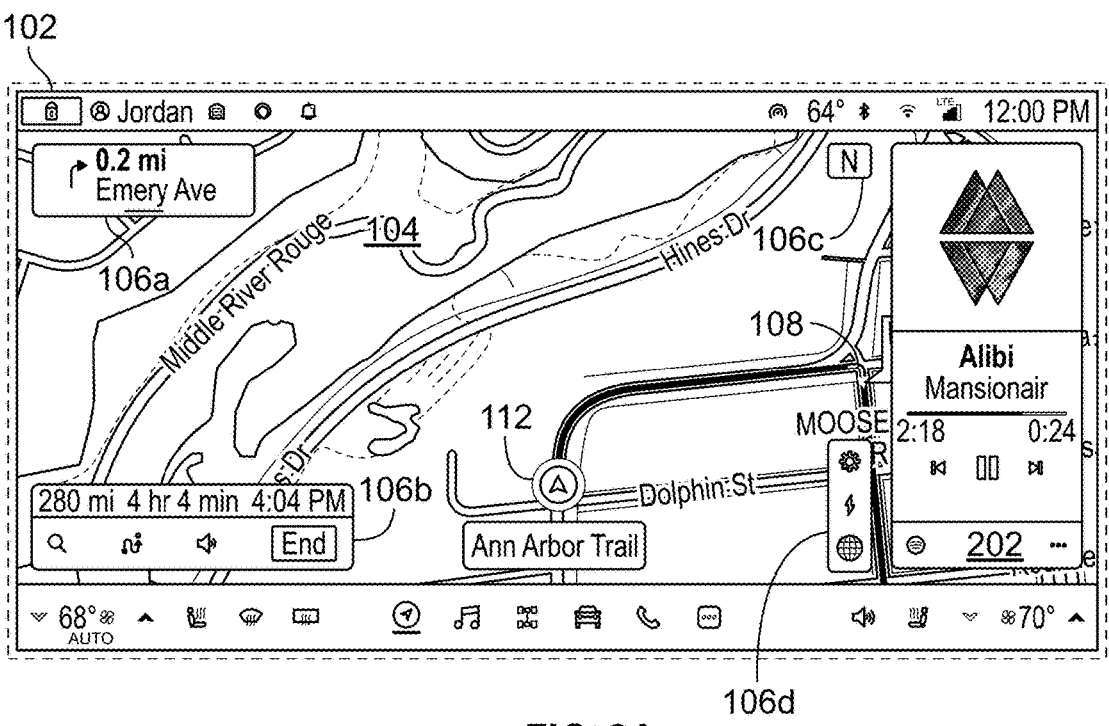
FIG. 2A shows an illustrative UI layer above a navigation UI, in accordance with some embodiments of the present disclosure.
FIG. 2B shows an illustrative navigation UI with time delay hiding functionality, in accordance with some embodiments of the present disclosure.

FIG. 2A shows an illustrative UI layer 202 above navigation UI 104, in accordance with some embodiments of the present disclosure, while FIG. 2B shows an illustrative navigation UI 104 with time delay hiding functionality, in accordance with some embodiments of the present disclosure. User interface 102 of FIG. 2A includes navigation UI 104, which includes navigation UI features 106a, 106b, 106c, and 106d, maneuver 108, and vehicle puck 112 of FIG. 1A. In addition, FIG. 2A includes UI layer 202. In some embodiments, UI layer 202 (e.g., a media UI) may show any suitable media (e.g., music, podcasts, etc.) to the user. In some embodiments, UI layer 202 may be a drive mode UI, a vehicle settings UI, a vehicle controls UI, an HVAC UI, a charging UI, an accessories UI, a weather UI, a cameras/sensors UI, or a UI for any other vehicle function. In some embodiments, UI layer 202 may take any size or shape and may be located in any suitable position above navigation UI 104 on user interface 102. It will be understood that FIG. 2A is an illustrative embodiment of a UI, so any featured components may be modified or substituted in accordance with the present disclosure. User interface 102 of FIG. 2B includes navigation UI 104, which includes navigation UI features 106a, 106b, 106c, and 106d, maneuver 108, and vehicle puck 112 of FIG. 1A. It will be understood that FIG. 2B is an illustrative embodiment of a UI, so any featured components may be modified or substituted in accordance with the present disclosure.

In FIG. 2A, UI layer 202 includes a media UI (e.g., a media panel) that, upon user selection, may play, pause, or toggle media (e.g., songs, podcasts, etc.) from a media library. UI layer 202 includes the media title, the media artist, cover art for the media, and a timer that tracks the progression of the media. In some embodiments, UI layer 202 may instead be a call UI that allows the user to make or receive phone calls. It will be understood that UI layer 202 may include any suitable UI that the vehicle's operating system supports. UI layer 202 is presented in a display region above navigation UI 104, which may obstruct mapping data (e.g., a building, a landmark, etc.) and hinder the user's ability to determine when to execute maneuver 108. In some embodiments, the display region in which UI layer 202 resides may be any suitable size and in any suitable location on top of navigation UI 104. In some embodiments, a gesture input (e.g., swiping the right edge of user interface 102 from right to left, double tapping user interface 102, etc.) by the user may activate UI layer 202. In FIG. 2B, processing circuitry hides UI layer 202 after a threshold time period of inactivity (e.g., 5 seconds). For example, in some embodiments, the threshold time period of inactivity may be 10 seconds, in which case a user may access the UI layer 202, via a gesture input, to play a particular song, and processing circuitry, after 10 seconds of inactivity, accordingly hides the UI layer 202 from user interface 102. It will be understood that the threshold time period of inactivity may be any suitable amount of time (e.g., 30 seconds, 45 seconds, 1 minute, etc.). Depending on the threshold time period of inactivity, UI layer 202 may remain hidden the rest of the vehicle's drive to its destination or until reactivated, leaving mapping data unobstructed for a majority of the trip. If the user invokes the UI layer 202 shortly before a maneuver 108, this may result in the UI layer 202 blocking mapping data of navigation UI 104, which may cause the user (e.g., the driver) to miss the maneuver 108. In some embodiments, the user may prefer having the UI layer 202 in view throughout the vehicle's trip to its destination.

Figure 3A:
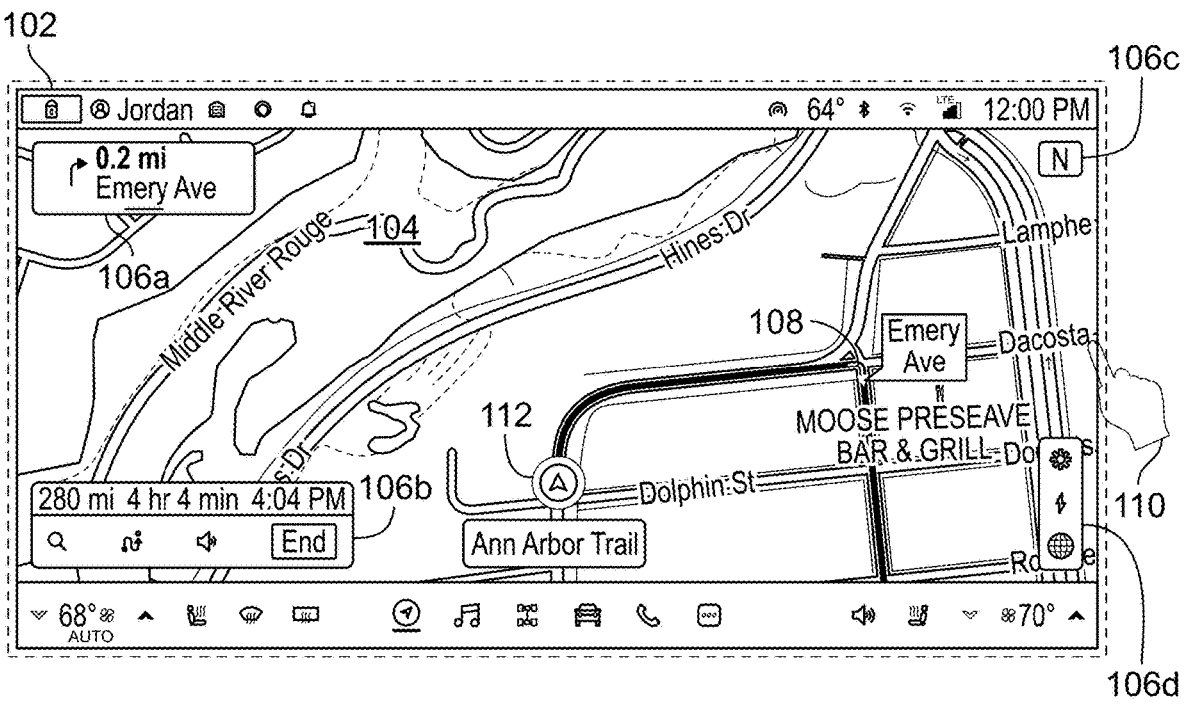
FIG. 3A shows an illustrative user interface, in accordance with some embodiments of the present disclosure.
Figure 3B:
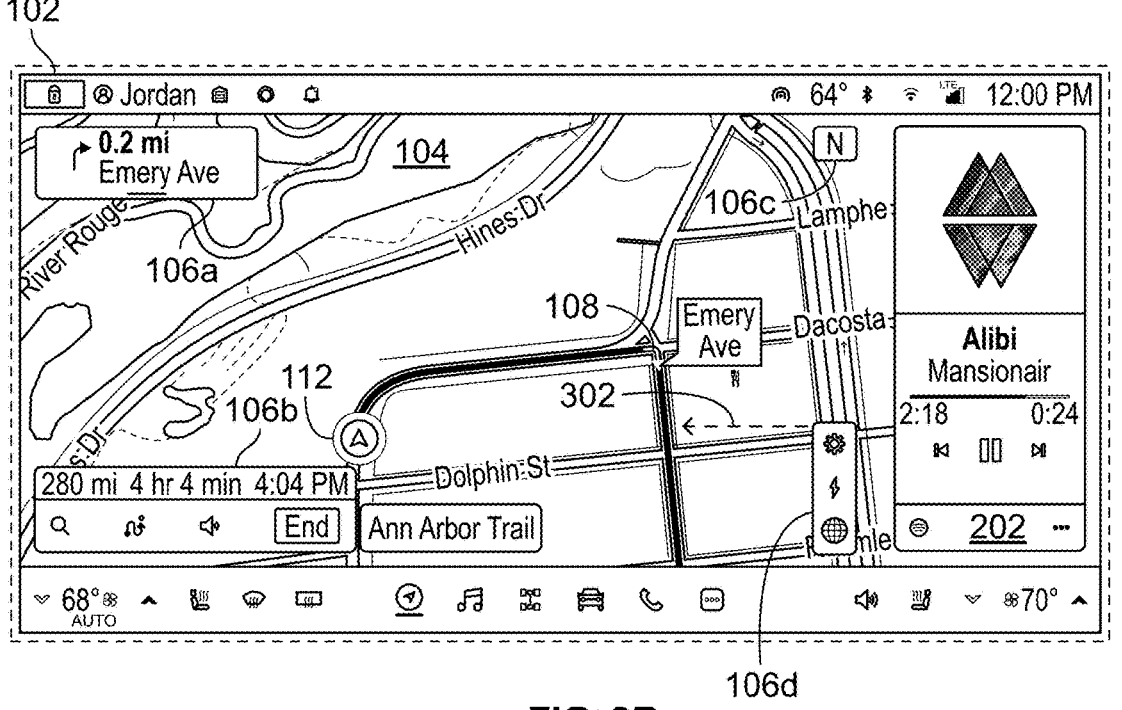
FIG. 3B shows an illustrative UI layer above a shifted navigation UI, in accordance with some embodiments of the present disclosure.

FIG. 3A shows an illustrative user interface 102, in accordance with some embodiments of the present disclosure, while FIG. 3B shows an illustrative UI layer 202 above a shifted navigation UI 104, in accordance with some embodiments of the present disclosure. User interface 102 of FIG. 3A includes navigation UI 104, which includes navigation UI features 106a, 106b, 106c, and 106d, maneuver 108, gesture input 110, and vehicle puck 112 of FIG. 1A. It will be understood that FIG. 3A is an illustrative embodiment of a UI and any featured components may be modified or substituted in accordance with the present disclosure. User interface 102 of FIG. 3B also includes navigation UI 104, navigation UI features 106a, 106b, 106c, and 106d, maneuver 108, and vehicle puck 112 of FIG. 1A. In addition, FIG. 3B includes UI layer 202 of FIG. 2A as well as shift 302 of the navigation UI 104. In some embodiments, shift 302 of navigation UI 104 may be any suitable distance in any suitable direction and may depend on the size of the display region in which UI layer 202 resides. It will be understood that FIG. 3B is an illustrative embodiment of a UI, and any featured components may be modified or substituted in accordance with the present disclosure.

In FIG. 3A, a user may initiate gesture input 110 (e.g., swiping the right edge of user interface 102 from right to left) to present UI layer 202 (e.g., a media UI, a call UI, etc.) in a display region above navigation UI 104. In FIG. 3B, processing circuitry shifts 302 navigation UI 104 to the left in response to gesture input 110 by the user, which prevents mapping data (e.g., Moose Preserve Bar & Grill) of navigation UI 104 from being obstructed by UI layer 202. It will be understood that the distance and/or direction of the shift 302 of navigation UI 104 may depend on the size and/or location of the display region in which UI layer 202 resides. If the user invokes UI layer 202, via gesture input, when the vehicle is near a maneuver 108, the shift 302 of the navigation UI 104 may be disorienting for the user and cause the user to miss the maneuver 108.

FIGS. 1-3 show illustrative techniques for managing a user interface 102 to accommodate multiple UI layers (e.g., a navigation UI 104 along with UI layer 202). The different techniques provide different advantages and disadvantages, but they do not take into account where a vehicle is relative to upcoming maneuvers, which may cause a driver to become disoriented or to miss an upcoming maneuver. In accordance with the present disclosure, one or more parameters of a UI layer (e.g., UI layer 202) may be modified when a vehicle is close to an upcoming maneuver to prevent navigation mapping data relevant to the upcoming maneuver from being obscured.

Figure 4:
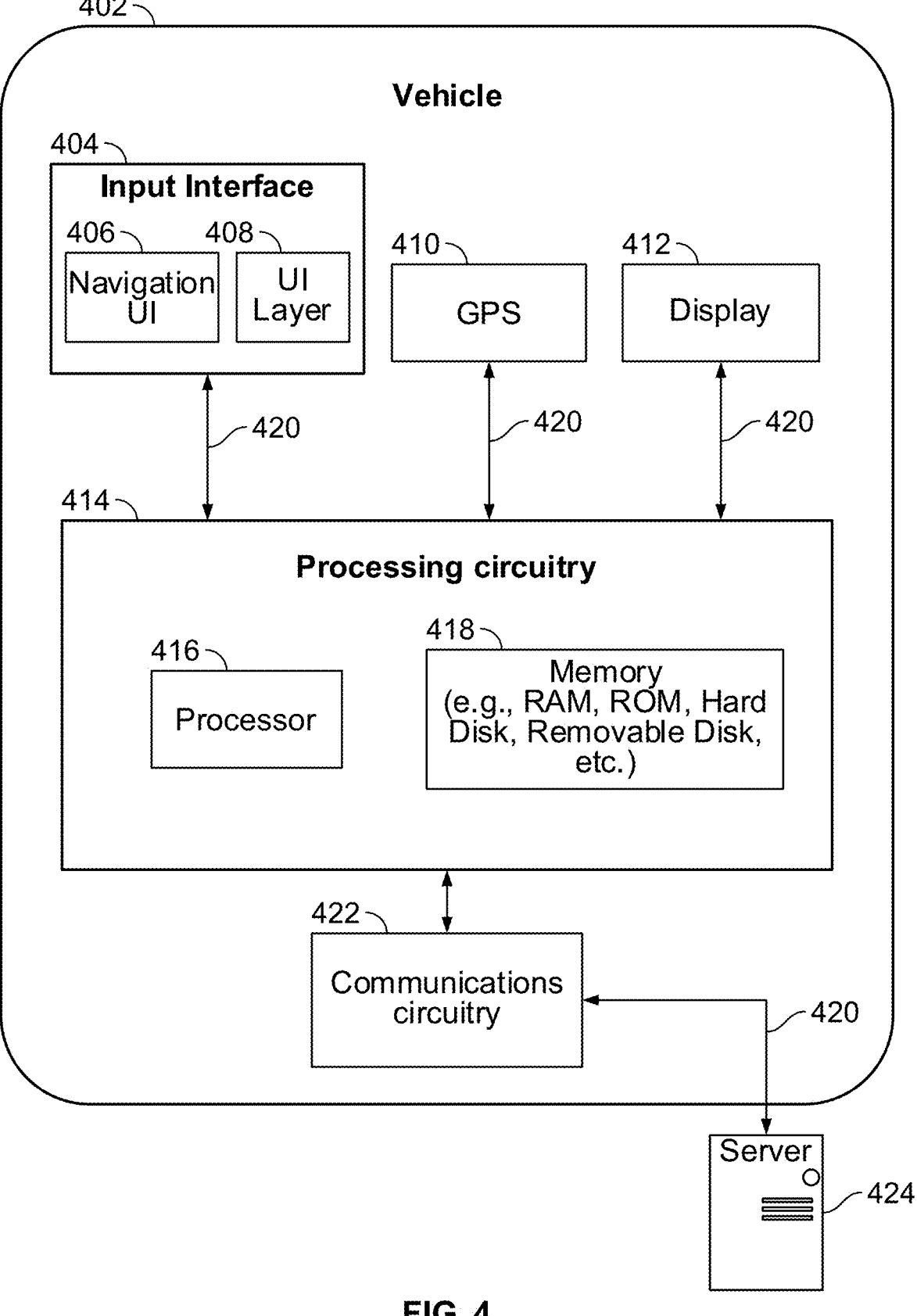
FIG. 4 shows a block diagram of a system for modifying a parameter of a UI layer to prevent the obstruction of mapping data, in accordance with some embodiments of the present disclosure.

FIG. 4 shows a block diagram of a system for modifying a parameter of UI layer 408 to prevent the obstruction of mapping data, in accordance with some embodiments of the present disclosure. Vehicle 402 may receive and distribute content and/or data, via input/output (I/O) path 420, to a plurality of components depicted in FIG. 4. I/O path 420 may receive and provide content (e.g., a media UI layer) and metadata (e.g., mapping data) to processing circuitry 414. Processing circuitry 414 may send and receive commands, requests, and other suitable data using I/O path 420. It will be understood that I/O path 420 may connect processing circuitry 414 to one or more communications paths (described below). One or more of these communications paths may provide the I/O functions but are shown as a single path in FIG. 4 to avoid overcomplicating the drawing.

Vehicle 402 may include processing circuitry 414, which may further include processor 416 and memory 418. Processor 416 may include a hardware processor, a software processor (e.g., a processor emulated using a virtual machine), or any combination thereof. In some embodiments, processor 416 and memory 418 in combination may be referred to as processing circuitry 414 of vehicle 402. In some embodiments, processor 416 alone may be referred to as processing circuitry 414 of vehicle 402. It will be understood that processing circuitry 414 may generate for display navigation UI 406 concurrently with UI layer 408 in a display region of input interface 404 (e.g., corresponding to user interface 102 of FIG. 1A). Memory 418 may include hardware elements for non-transitory storage of commands or instructions, that, when executed by processor 416, cause processor 416 to operate vehicle 402 in accordance with embodiments described above and below. For example, processing circuitry 414, via navigation UI 406 (e.g., corresponding to navigation UI 104 of FIG. 1A), may detect an upcoming maneuver, determine that mapping data relevant to the upcoming maneuver is present in a display region such that it would be obscured by UI layer 408 (e.g., corresponding to UI layer 202 of FIG. 2A), and modify a parameter of UI layer 408 to prevent the relevant mapping data from being obscured. In some embodiments, memory 418 may use non-volatile memory (e.g., to launch a boot-up routine and other instructions) or cloud-based storage to supplement memory capacity. It will be understood that processing circuitry 414 may be communicatively connected to components of vehicle 402 via one or more wires, or via wireless connection.

In client-server based embodiments, vehicle 402 may include communications circuitry 422 suitable for communicating with server 424 or other networks or servers remote from vehicle 402. Server 424 may store the instructions for carrying out some or all of the above-mentioned functionality in some embodiments. Communications circuitry 422 may include a wireless modem for communications with other equipment (e.g., a satellite, another vehicle, etc.) or any other suitable communications circuitry. Such communications may involve the Internet or any other suitable communications networks or paths. In addition, communications circuitry 422 may include circuitry that enables peer-to-peer communication of vehicle devices or communications of vehicle devices in locations remote from each other.

Input interface 404 may be communicatively coupled to processing circuitry 414 via I/O path 420. In some embodiments, via input interface 404, a driver of vehicle 402 may be able to select certain settings in connection with the operation of vehicle 402 (e.g., HVAC control, drive modes, telephone communication, vehicle sensors, etc.). In some embodiments, processing circuitry 414 may be communicatively connected to a navigation system, e.g., Global Positioning System (GPS) 410, where the driver may interact with GPS 410 via navigation UI 406. GPS 410 may be in communication with multiple satellites to ascertain the vehicle's location and provide a route distance between the vehicle's location and an upcoming maneuver to the processing circuitry 414. In some embodiments, GPS 410 may operate on terrestrial signals, such as cell phone signals, Wi-Fi signals, or ultra-wideband signals, to determine a location of vehicle 402. The determined location may be in any suitable form such as a geographic coordinate, a street address, or a nearby landmark such as a tagged location associated with the vehicle (e.g., a location of a home or priority location of the user stored in memory 418). In some embodiments, processing circuitry 414 uses the determined location to identify whether the vehicle is within a threshold distance of an upcoming maneuver (e.g., a U-turn, merging left onto a highway, a right turn at an intersection, etc.).

Processing circuitry 414 may be communicatively coupled to display 412 via I/O path 420. Display 412 may be located at a dashboard of vehicle 402 and/or a heads-up display at a windshield of vehicle 402. It will be understood that display 412 may be a touchscreen or touch-sensitive display. In some embodiments, display 412 may be integrated or combined with input interface 404, including navigation UI 406 and UI layer 408. Display 412 may be one or more of a monitor, a liquid crystal display (LCD), an amorphous silicon display, a low temperature poly silicon display, an electronic ink display, an electrophoretic display, an active matrix display, an electro-wetting display, an electro-fluidic display, a cathode ray tube display, a light-emitting diode display, an electroluminescent display, a plasma display panel, a high-performance addressing display, a thin-film transistor display, an organic light-emitting diode display, a surface-conduction electron-emitter display (SED), a laser television, carbon nanotubes, a quantum dot display, an organic light-emitting diode (OLED) display, a light-emitting diode (LED) display, or any other suitable equipment for displaying visual images. In some embodiments, display 412 may be a 3D display that presents the content and/or metadata in 3D. A video or graphics card may generate the output to display 412. The video card may offer various functions such as accelerated rendering of 3D scenes and 2D graphics, MPEG5 2/MPEG-4 decoding, TV output, or the ability to connect to multiple monitors. It will be understood that the video card may be any suitable processing circuitry described herein in relation to processing circuitry 414 and, in some embodiments, may integrate with processing circuitry 414. In some embodiments, vehicle 402 may also incorporate or be accessible to one or more vehicle sensors (e.g., cameras, radar, LiDAR, ultrasonic sensors, global navigation satellite sensors, electromechanical sensors, etc.) attached to vehicle 402, which may provide vehicle 402 with data regarding the vehicle's immediate, surrounding environment.

Processing circuitry 414 may include video generating circuitry, encoding circuitry (e.g., for delivering vehicle information to server 424, a satellite, or another vehicle), and decoding circuitry (e.g., for receiving instructions/commands from server 424 or a satellite) in some embodiments described herein. Software running on one or more general purpose or specialized processors 416 may implement the circuitry described herein.

A user may send instructions to processing circuitry 414 using either navigation UI 406 (e.g., corresponding to navigation UI 104 of FIG. 1A) or UI layer 408 (e.g., corresponding to UI layer 202 of FIG. 2A) via input interface 404 (e.g., corresponding to user interface 102 of FIG. 1A).

In some embodiments, vehicle 402 may receive data generated by server 424 and may display the data locally at vehicle 402 via display 412. This way, the processing of instructions is performed remotely by the server while the resulting data is provided locally at vehicle 402. In some embodiments, the processing of user-selected instructions, received by navigation UI 406 and/or UI layer 408 via input interface 404, may happen locally at vehicle 402. For example, a user (e.g., a driver) may input a destination, via navigation UI 406, and along the charted route to the destination the user may attempt to access UI layer 408 with a gesture input to change the song currently playing. In some embodiments, the vehicle 402 may be within a threshold distance to a maneuver (e.g., a turn at an intersection, exiting a highway, merging onto a freeway, etc.) and detect mapping data within the display region of UI layer 408, in which case processing circuitry 414 modifies a parameter of UI layer 408 to, for example, prohibit access to UI layer 408 and generate a notification alerting the user that access has been blocked. In some embodiments, if UI layer 408 is already in view on input interface 404, the vehicle 402 is within a threshold distance to a maneuver, and processing circuitry 414 detects mapping data within the display region of UI layer 408, processing circuitry 414 may modify a parameter of UI layer 408 to hide the layer.

Figure 5A:
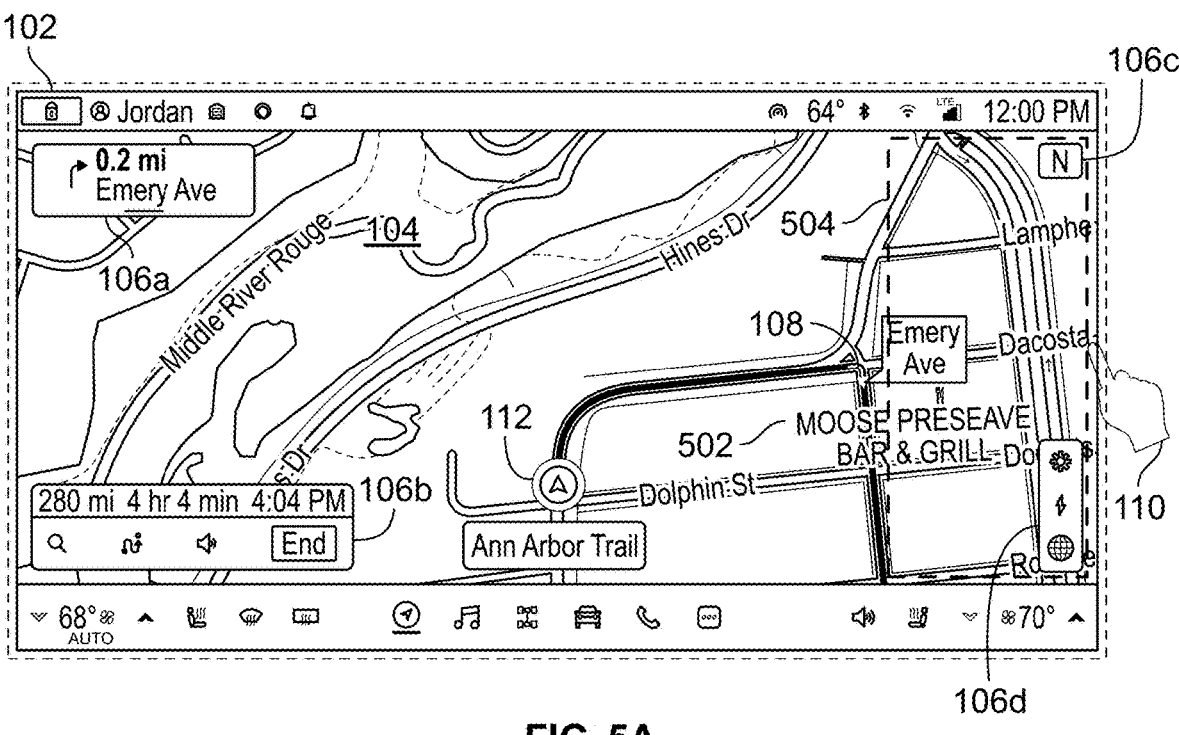
FIG. 5A shows an illustrative user interface with mapping data present in a display region, in accordance with some embodiments of the present disclosure.
Figure 5B:
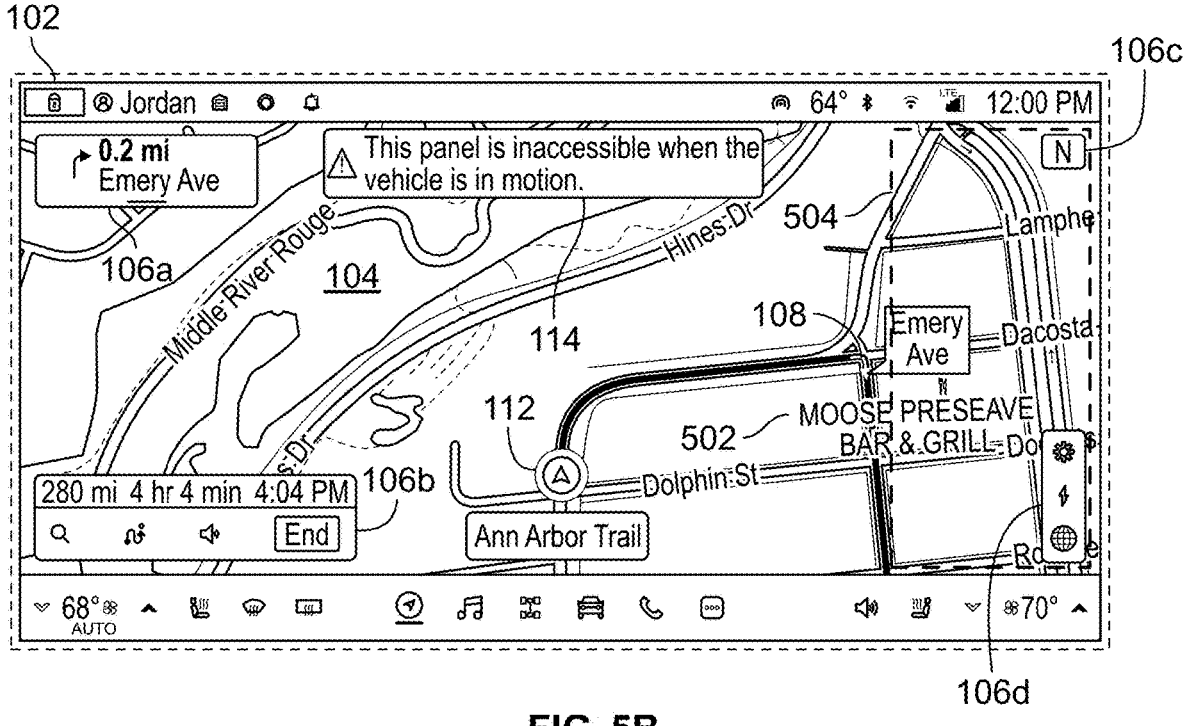
FIG. 5B shows an illustrative user interface with a maneuver proximity notification, in accordance with some embodiments of the present disclosure.

FIG. 5A shows an illustrative user interface 102 with mapping data 502 present in display region 504, in accordance with some embodiments of the present disclosure, while FIG. 5B shows an illustrative user interface 102 with a maneuver proximity notification 506, in accordance with some embodiments of the present disclosure. The user interface 102 of FIG. 5A includes navigation UI 104, which includes navigation UI features 106a, 106b, 106c, and 106d, maneuver 108, gesture input 110, and vehicle puck 112 of FIG. 1A. In addition, FIG. 5A includes mapping data 502 and display region 504. In some embodiments, display region 504 may be any suitable size and/or shape and may be located in any suitable location above navigation UI 104. For example, display region 504, in some embodiments, may be a slender rectangle located at the top of navigation UI 104 to the right of navigation UI feature 106a. It will be understood that mapping data 502 may be any suitable building, landmark, road, body of water, etc. For example, as depicted in FIG. 5A, mapping data 502 includes "Moose Preserve Bar & Grill." It will be understood that FIG. 5A is an illustrative embodiment of a UI and any featured components may be modified or substituted in accordance with the present disclosure. The user interface 102 of FIG. 5B includes navigation UI 104, which includes navigation UI features 106a, 106b, 106c, and 106d, maneuver 108, and vehicle puck 112 of FIG. 1A. FIG. 5B additionally includes mapping data 502 and display region 504 of FIG. 5A as well as maneuver proximity notification 506. In some embodiments, processing circuitry determines when to present maneuver proximity notification 506. It will be understood that FIG. 5B is an illustrative embodiment of a UI, and any featured components may be modified or substituted in accordance with the present disclosure.

In FIG. 5A, mapping data 502 represents any suitable road, highway, landmark, building, landmass, body of water, region, etc. that a user (e.g., a driver) may use to orient themselves and help identify when to execute maneuver 108. For example, as depicted in FIG. 5A, mapping data 502 includes "Moose Preserve Bar & Grill," which serves as a landmark for the user to know when to execute maneuver 108 (e.g., a right turn on Emery Avenue). Display region 504 represents an area above navigation UI 104 where a UI layer (e.g., a media UI, a call UI, etc.) is displayed after being invoked by gesture input 110 (e.g., swiping the right edge of user interface 102 from right to left). In some embodiments, display region 504 may be any suitable size and/or shape and may be located in any suitable area above navigation UI 104. As conveyed by FIG. 5A, as the vehicle approaches maneuver 108 (e.g., within a threshold distance), display region 504 encompasses mapping data 502 (e.g., "Moose Preserve Bar & Grill). Upon initiation of the UI layer by gesture input 110, the display of the UI layer in display region 504 may make it difficult for the user to determine when to execute maneuver 108 due to the UI layer obscuring mapping data 502. Therefore, the processing circuitry 414 may modify a parameter of the UI layer (e.g., to prevent the UI layer from being displayed in display region 504) when the vehicle 402 is within a threshold distance from maneuver 108. The threshold distance may be any suitable distance (e.g., 0.1 miles, 0.25 miles, 1 mile, etc.) with respect to maneuver 108. As shown in FIG. 5B, processing circuitry 414 prohibits access to the UI layer and generates maneuver proximity notification 506, in response to the gesture input by the user. Processing circuitry 414 may prohibit access when vehicle 402 is within a threshold distance (e.g., 0.5 miles) of a detected upcoming maneuver 108 and when it is determined that the display region 504 encompasses mapping data 502 of navigation UI 104. For example, in some embodiments, if vehicle 402 is farther than 0.5 miles from maneuver 108 or processing circuitry 414 determines mapping data 502 is not present within display region 504, the user may be allowed to invoke the UI layer, via a gesture input, in display region 504 to access a media UI or a call UI. However, if vehicle 402 is less than 0.5 miles from maneuver 108 and mapping data 502 is present within display region 504, processing circuitry 414 may prohibit user access to the UI layer and display maneuver proximity notification 506. It will be understood that processing circuitry 414 may delay the display of the UI layer until after the vehicle has completed maneuver 108. In some embodiments, processing circuitry 414 may modify other parameters (e.g., translucency, size, location, etc.), or any combination thereof, of the UI layer, in response to a gesture input by the user, upon detecting an upcoming maneuver 108 within a threshold distance to the vehicle and determining that display region 504 encompasses mapping data 502 of navigation UI 104. It will be understood that in some embodiments, vehicle puck 112 stays in the same position near the bottom of navigation UI 104 (e.g., where it is easy for the user to locate) throughout the vehicle's trip to its destination. In some embodiments, the modification of the parameter of the UI layer may be prohibited or prevented based on driver behavior. For example, if the driver is driving a route to a common destination (e.g., their normal commute to or from work), the processing circuitry 414 may recognize a common destination and not modify the parameter of the UI layer.

Figure 6A:
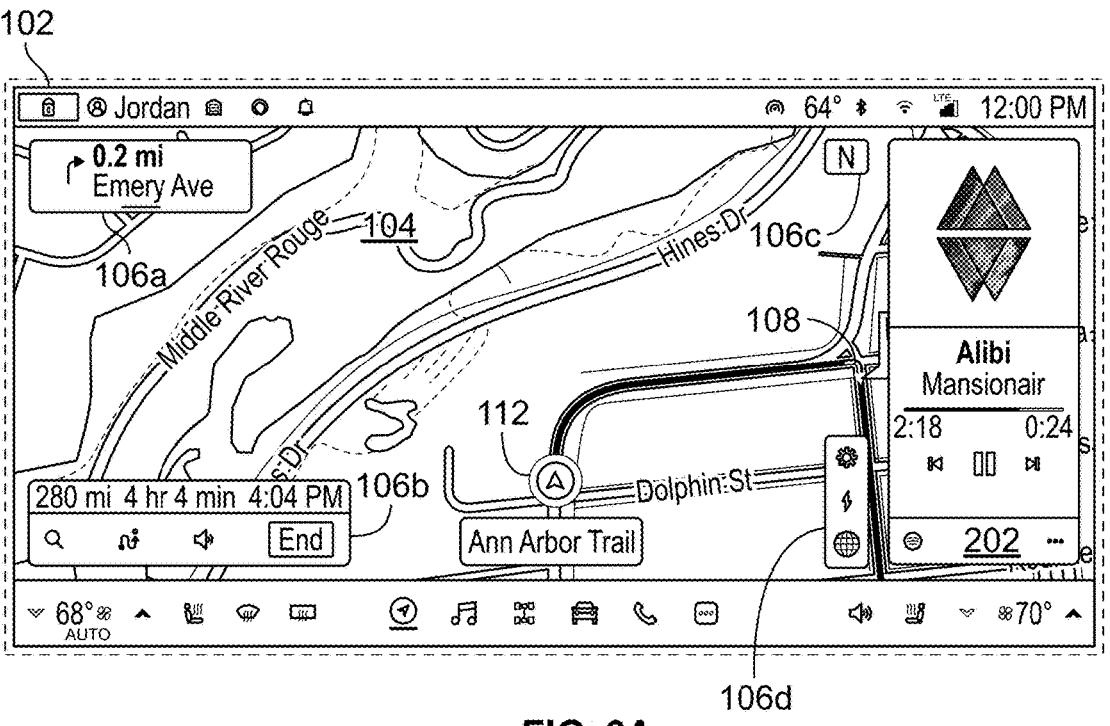
FIG. 6A shows an illustrative user interface having a UI layer above a navigation UI, in accordance with some embodiments of the present disclosure.
Figure 6B:
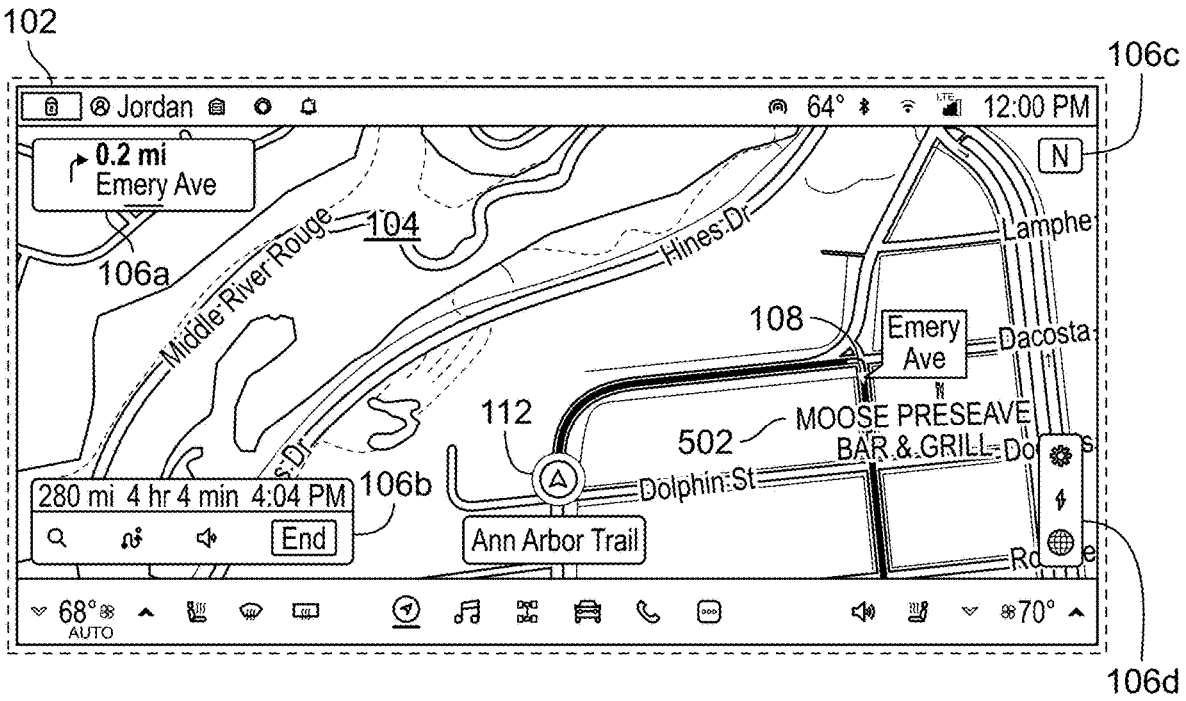
FIG. 6B shows an illustrative user interface with maneuver proximity hiding functionality, in accordance with some embodiments of the present disclosure.

FIG. 6A shows an illustrative user interface 102 having a UI layer 202 above navigation UI 104, in accordance with some embodiments of the present disclosure, while FIG. 6B shows an illustrative user interface 102 with maneuver proximity hiding functionality, in accordance with some embodiments of the present disclosure. The user interface 102 of FIG. 6A includes navigation UI 104, which includes navigation UI features 106a, 106b, 106c, and 106d, maneuver 108, and vehicle puck 112 of FIG. 1A. In addition, FIG. 6A includes UI layer 202 of FIG. 2A. In some embodiments, UI layer 202 may be any suitable size and/or shape and may be located in any suitable location above navigation UI 104. It will be understood that FIG. 6A is an illustrative embodiment of a user interface and any featured components may be modified or substituted in accordance with the present disclosure. The user interface 102 of FIG. 6B includes navigation UI 104, which includes navigation UI features 106a, 106b, 106c, and 106d, maneuver 108, and vehicle puck 112 of FIG. 1A as well as mapping data 502 of FIG. 5A. In some embodiments, mapping data 502 may be any suitable landmark, building, road, landmass, body of water, region, etc. depicted in navigation UI 104. It will be understood that FIG. 6B is an illustrative embodiment of a user interface and any featured components may be modified or substituted in accordance with the present disclosure.

In FIG. 6A, a user invoked UI layer 202 (e.g., a media UI, a call UI, etc.) via a gesture input (e.g., swiping the right edge of user interface 102 from right to left with multiple fingers). UI layer 202 is presented in a display region above navigation UI 104, which may obstruct mapping data (e.g., a building, a landmark, etc.) and hinder a user's ability to determine when to execute maneuver 108. In FIG. 6B, processing circuitry 414 hides UI layer 202 because vehicle 402 is determined to be within a threshold distance (e.g., 0.2 miles) from maneuver 108 (e.g., a right turn at an intersection), and processing circuitry 414 determines that the display region in which UI layer 202 resides encompasses mapping data 502 (e.g., "Moose Preserve Bar & Grill"). In some embodiments, once vehicle 402 completes maneuver 108, processing circuitry 414 automatically presents UI layer 202 in its display region above navigation UI 104. It will be understood that, while UI layer 202 is hidden by processing circuitry 414, the user may invoke UI layer 202 via gesture input. In some embodiments, vehicle puck 112 stays in the same position near the bottom of user interface 102 (e.g., where it is easy for the user to locate) throughout the vehicle's trip to its destination.

Figure 7:
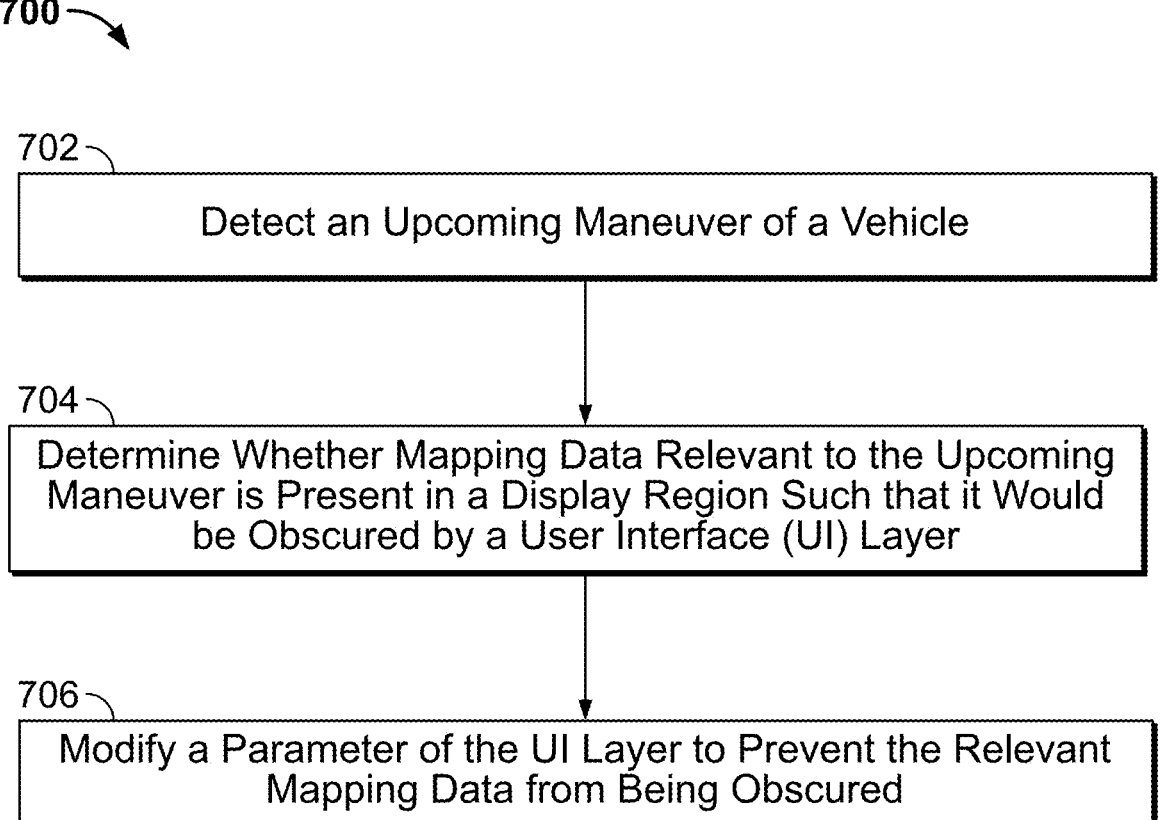
FIG. 7 shows an illustrative flowchart depicting an exemplary process for adjusting a UI layer based on proximity to an upcoming maneuver, in accordance with some embodiments of the present disclosure.

FIG. 7 shows an illustrative flowchart depicting an exemplary process 700 for adjusting a UI layer based on proximity to an upcoming maneuver, in accordance with some embodiments of the present disclosure. The process 700 may be executed by processing circuitry 414 of FIG. 4, which is located in vehicle 402. It will be understood that process 700, and any step thereof, may be altered to any suitable configuration, including modifications to any of the steps themselves.

The process 700 begins at step 702, where processing circuitry 414 detects an upcoming maneuver of a vehicle. In some embodiments, the maneuver may be any suitable, legal driving action (e.g., a turn at an intersection, merging onto a highway, exiting a highway, a U-turn, etc.). In some embodiments, processing circuitry 414 detects the upcoming maneuver when vehicle 402 is within a threshold distance or time (e.g., 0.75 miles or 30 seconds) to the maneuver. The process 700 proceeds to step 704, where processing circuitry 414 determines whether mapping data relevant to the upcoming maneuver is present in a display region such that it would be obscured by a UI layer. It will be understood that the mapping data may be any suitable building, landmark, road, landmass, body of water, etc. that a user (e.g., a driver) may use to help orient themselves and to identify when to execute the upcoming maneuver. The display region represents an area above navigation UI where the UI layer (e.g., a media UI, a call UI, etc.) is displayed (e.g., after being invoked by a gesture input). In some embodiments, the display region may encompass the mapping data while the vehicle is concurrently within a threshold distance to the upcoming maneuver, which, upon invocation of the UI layer, may obscure the mapping data and make it more difficult for the user to determine when to execute the upcoming maneuver. The process proceeds to step 706, where processing circuitry 414 modifies a parameter of the UI layer to prevent the relevant mapping data from being obscured. In some embodiments, the parameter may include translucency, size, location, or activation of the UI layer. For example, as described above, processing circuitry 414 may prevent the display of the UI layer until after the vehicle completes the maneuver, or processing circuitry 414 may hide the UI layer if the UI layer is already in view. In some embodiments, processing circuitry 414 may increase the translucency of the UI layer to allow the user to clearly see the mapping data located in the display region of the UI layer. In other embodiments, processing circuitry 414 may reduce the size or change the location of the UI layer to clearly show the mapping data to the user.

Figure 8:
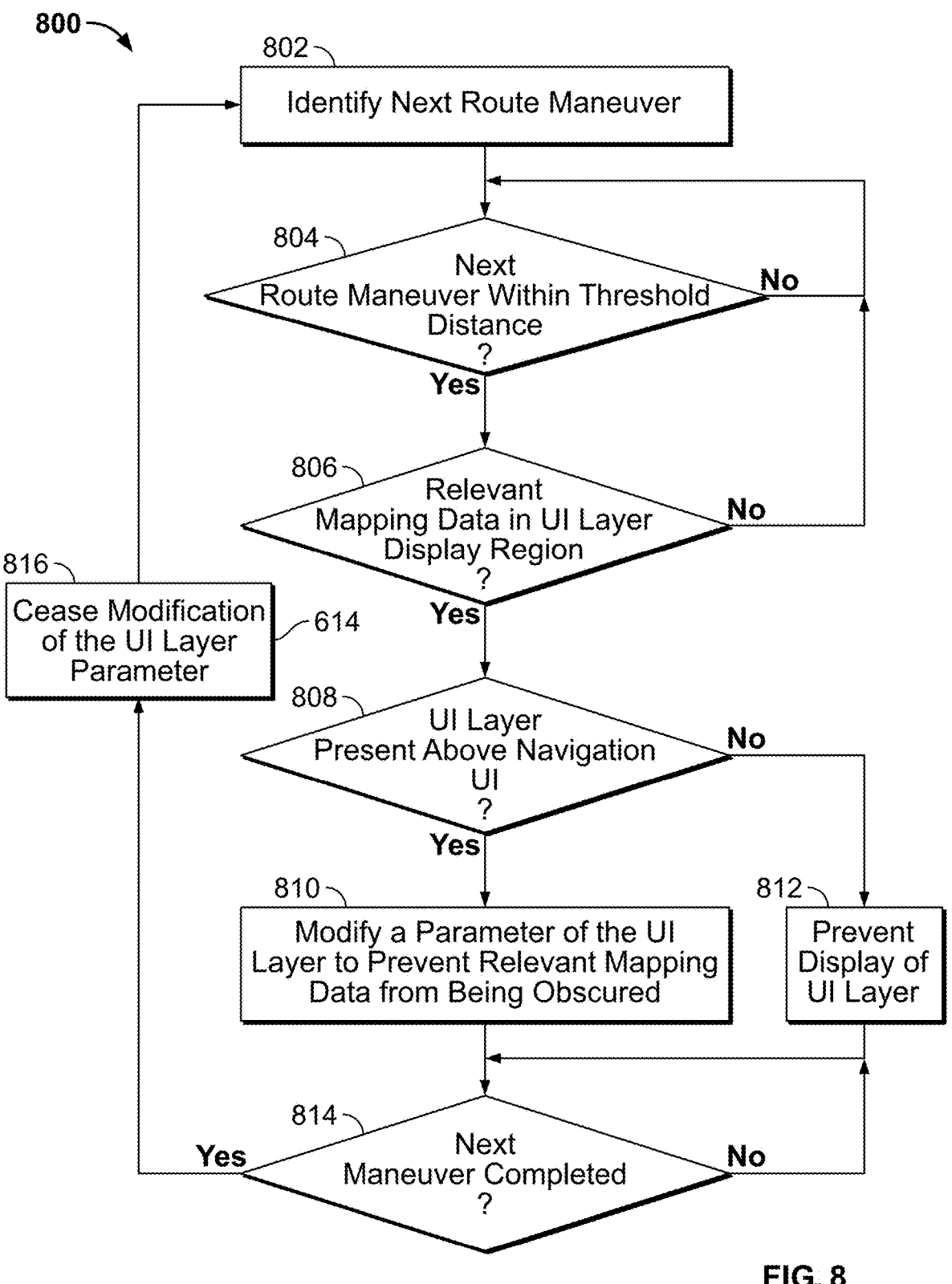
FIG. 8 shows an illustrative flowchart depicting an exemplary process for modifying a UI layer based on presence of mapping data and proximity to an upcoming maneuver, in accordance with some embodiments of the present disclosure.

FIG. 8 shows an illustrative flowchart depicting an exemplary process 800 for modifying a UI layer based on presence of mapping data and proximity to an upcoming maneuver, in accordance with some embodiments of the present disclosure. The process 800 may be executed by processing circuitry 414 of FIG. 4. It will be understood that process 800, and any step thereof, may be altered to any suitable configuration, including modifications to any of the steps themselves.

The process 800 begins at step 802, where processing circuitry 414 identifies a next route maneuver (e.g., merging onto a highway, a U-turn, exiting a freeway, etc.) for vehicle 402 to reach its destination. It will be understood that the maneuver may include any suitable legal driving action. The process 800 proceeds to step 804, where processing circuitry 414 determines whether vehicle 402 is within a threshold distance or time (e.g., 0.25 miles or 30 seconds) from the next route maneuver. It will be understood that the threshold distance may be any suitable distance (e.g., 0.1 miles, 0.5 miles, 1 mile, etc.) of any suitable unit (e.g., miles, kilometers, etc.) or any suitable time (e.g., 30 seconds, 45 seconds, 1 minute, etc.). If processing circuitry 414 determines vehicle 402 is within the threshold distance from the next route maneuver, process 800 proceeds to step 806. If processing circuitry 414 determines vehicle 402 is outside the threshold distance from the next route maneuver, process 800 repeats or stays at step 804 until processing circuitry 414 determines that vehicle 402 is within the threshold distance from the next route maneuver.

At step 806, processing circuitry 414 determines whether relevant mapping data (e.g., a building, a landmark, a road, etc.) of a navigation UI is present in a display region of a UI layer. In some embodiments, the display region of the UI layer may be any suitable size and/or shape and may be located in any suitable area above the navigation UI. If processing circuitry 414 determines relevant mapping data exists in the display region of the UI layer, process 800 proceeds to step 808. If processing circuitry 414 determines no relevant mapping data exists in the display region of the UI layer, process 800 returns to step 804.

At step 808, processing circuitry 414 determines whether the UI layer (e.g., a call UI, a media UI, etc.) is present above the navigation UI. If processing circuitry 414 determines the UI layer is not present above the navigation UI, process 800 proceeds to step 812, where processing circuitry 414 may modify a parameter of the UI layer to prevent the display of the UI layer (e.g., to prevent the obstruction of the relevant mapping data a driver may use to determine when to execute a maneuver) until vehicle 402 has completed the next route maneuver at step 814, in which case process 800 advances to step 816, where processing circuitry 414 ceases the modification of the UI layer parameter and, in some embodiments, presents the UI layer above the navigation UI. If processing circuitry 414 prevents the display of the UI layer at step 812 and proceeds to step 814 where vehicle 402 has yet to complete the next route maneuver, the process 800 repeats or stays at step 814 until the maneuver is completed.

At step 808, if processing circuitry 414 determines the UI layer is present above the navigation UI, the process 800 proceeds to step 810, where processing circuitry 414 modifies a parameter of the UI layer to prevent the relevant mapping data from being obscured. In some embodiments, processing circuitry 414 may modify the parameter of the UI layer by hiding the UI layer from the user interface. It will be understood that if a user invokes a gesture input (e.g., swiping the right edge of the user interface from right to left) before the next maneuver is completed, processing circuitry 414 may override the modification and present the UI layer above the navigation UI. Contrarily, if a user invokes a gesture input after process 800 proceeds through step 812, processing circuitry 414 may present a notification and prohibit access to the UI layer. After modifying the parameter of the UI layer at step 810, the process 800 proceeds to step 814, where processing circuitry 414 either determines vehicle 402 has completed the next route maneuver, in which case processing circuitry 414 ceases the modification of the UI layer parameter, or determines vehicle 402 has not completed the next route maneuver, in which case the process 800 repeats or stays at step 814 until the next route maneuver is completed.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A user interface (UI) system, comprising:
a display;
a navigation UI displayed on the display; and
processing circuitry configured to:
    detect an upcoming maneuver of a vehicle;
    determine a display region of the navigation UI comprising mapping data relevant to the upcoming maneuver;
    receive a user input that prompts a UI layer to be displayed;
    determine whether causing the display of the UI layer will obscure the display region of the navigation UI comprising the mapping data relevant to the upcoming maneuver;
    in response to (a) detecting the upcoming maneuver and (b) determining that causing the display of the UI layer will obscure the display region of the navigation UI comprising the mapping data relevant to the upcoming maneuver:
    delay displaying the UI layer in the display region to prevent the relevant mapping data from being obscured until after detecting that the vehicle has completed the maneuver.

2. The system of claim 1, wherein the processing circuitry is further configured to, in response to (a) detecting the upcoming maneuver and (b) while the mapping data relevant to the upcoming maneuver is present in the display region on top of the navigation UI, receiving an input that prompts the UI layer to be displayed in the display region, modify a parameter of the UI layer to prevent the relevant mapping data from being obscured, wherein the parameter comprises one of: translucency of the UI layer, a size of the UI layer, a location of the UI layer, or activation of the UI layer.

3. The system of claim 2, wherein modifying the parameter of the UI layer comprises deactivating the UI layer to hide the UI layer.

4. The system of claim 3, wherein the processing circuitry is further configured to display the UI layer upon completion of the maneuver.

5. The system of claim 3, wherein the processing circuitry is further configured to, while the UI layer is hidden, override the deactivation and display the UI layer in response to a gesture input on the display.

6. The system of claim 3, wherein the UI layer comprises a selectable option, and wherein the processing circuitry is further configured to, while the UI layer is hidden, respond to a selection of the hidden selectable option when an area of the display is touched that corresponds to a location of the hidden selectable option.

7. The system of claim 2, wherein the processing circuitry is further configured to:

prevent a modification of the parameter of the UI layer based on driver behavior, and wherein the driver behavior comprises a route to a common destination.

8. The system of claim 1, wherein the UI layer comprises a media UI or a call UI.

9. The system of claim 1, wherein the processing circuitry is configured to detect the upcoming maneuver based on distance to the upcoming maneuver or time to the upcoming maneuver.

10. A user interface (UI) method, comprising:

displaying a navigation UI;

detecting an upcoming maneuver of a vehicle;

determining a display region of the navigation UI comprising mapping data relevant to the upcoming maneuver;

receiving a user input that prompts a UI layer to be displayed;

determining whether causing the display of the UI layer will obscure the display region of the navigation UI comprising the mapping data relevant to the upcoming maneuver;

in response to (a) detecting the upcoming maneuver and (b) determining that causing the display of the UI layer will obscure the display region of the navigation UI comprising the mapping data relevant to the upcoming maneuver:

delaying displaying the UI layer in the display region to prevent the relevant mapping data from being obscured until after detecting that the vehicle has completed the maneuver.

11. The method of claim 10, further comprising, in response to (a) detecting the upcoming maneuver and (b) while the mapping data relevant to the upcoming maneuver is present in the display region, receiving an input that prompts the UI layer to be displayed in the display region on top of the navigation UI, modifying a parameter of the UI layer to prevent the relevant mapping data from being obscured, wherein the parameter comprises one of: translucency of the UI layer, a size of the UI layer, a location of the UI layer, or activation of the UI layer.

12. The method of claim 11, wherein modifying the parameter of the UI layer comprises deactivating the UI layer to hide the UI layer.

13. The method of claim 12, further comprising displaying the UI layer upon completion of the maneuver.

14. The method of claim 12, further comprising, while the UI layer is hidden, overriding the deactivation and displaying the UI layer in response to a gesture input on the display.

15. The method of claim 12, wherein the UI layer comprises a selectable option, and wherein the method further comprises, while the UI layer is hidden, responding to a selection of the hidden selectable option when an area of a display is touched that corresponds to a location of the hidden selectable option.

16. The method of claim 11, further comprising:

preventing a modification of the parameter of the UI layer based on driver behavior, and wherein the driver behavior comprises a route to a common destination.

17. The method of claim 10, wherein the UI layer comprises a media UI or a call UI.

18. The method of claim 10, further comprising detecting the upcoming maneuver based on distance to the upcoming maneuver or time to the upcoming maneuver.

* * * * *